(12) United States Patent
Yampanis et al.

(10) Patent No.: US 8,079,053 B2
(45) Date of Patent: Dec. 13, 2011

(54) SYSTEM AND METHOD OF DEFERRING MULTIMEDIA CONTENT DELIVERY

(75) Inventors: Mark Yampanis, Berkeley, CA (US); Adam Klein, Cedar Park, TX (US); Austin Britt, Austin, TX (US); Stephen Rys, Austin, TX (US)

(73) Assignee: AT&T Intellectual Property, I, L.P., Atlanta, GA (US)

( * ) Notice: Subject to any disclaimer, the term of this patent is extended or adjusted under 35 U.S.C. 154(b) by 700 days.

(21) Appl. No.: 11/803,696

(22) Filed: May 15, 2007

(65) Prior Publication Data

US 2008/0285936 A1 Nov. 20, 2008

(51) Int. Cl.
*H04N 7/173* (2011.01)

(52) U.S. Cl. ............... 725/93; 725/86; 725/87; 725/88; 725/89; 725/90; 725/91; 725/92; 725/94; 725/95; 725/96; 725/100; 725/133; 725/141; 725/153; 725/115; 725/145; 725/58

(58) Field of Classification Search ............. 725/86–96, 725/100, 133, 141, 153, 115, 145, 58
See application file for complete search history.

(56) References Cited

U.S. PATENT DOCUMENTS

| | | | | |
|---|---|---|---|---|
| 6,853,728 B1 * | 2/2005 | Kahn et al. | ............ | 380/239 |
| 7,017,174 B1 * | 3/2006 | Sheedy | ............ | 725/87 |
| 7,284,032 B2 * | 10/2007 | Weber | ............ | 709/204 |
| 7,298,960 B1 * | 11/2007 | Taylor et al. | ............ | 386/46 |
| 7,457,520 B2 * | 11/2008 | Rossetti et al. | ............ | 386/83 |
| 7,546,283 B2 * | 6/2009 | Ota | ............ | 1/1 |
| 7,603,022 B2 * | 10/2009 | Putterman et al. | ............ | 386/46 |
| 7,610,606 B2 * | 10/2009 | Carlucci et al. | ............ | 725/95 |
| 7,614,064 B2 * | 11/2009 | Zigmond | ............ | 725/9 |
| 2001/0042170 A1 * | 11/2001 | Belknap et al. | ............ | 711/118 |
| 2002/0154892 A1 * | 10/2002 | Hoshen et al. | ............ | 386/87 |
| 2003/0056217 A1 * | 3/2003 | Brooks | ............ | 725/46 |
| 2003/0192054 A1 * | 10/2003 | Birks et al. | ............ | 725/100 |
| 2006/0218620 A1 | 9/2006 | Nadarajah et al. | | |
| 2007/0033617 A1 * | 2/2007 | Bloebaum | ............ | 725/58 |
| 2007/0058924 A1 | 3/2007 | Yeh | | |
| 2007/0104456 A1 * | 5/2007 | Craner | ............ | 386/83 |
| 2007/0162947 A1 * | 7/2007 | Bertin | ............ | 725/134 |

OTHER PUBLICATIONS

U.S. Appl. No. 11/656,881, filed Jan. 23, 2007.

* cited by examiner

*Primary Examiner* — Jason Salce
(74) *Attorney, Agent, or Firm* — Toler Law Group (57) ABSTRACT

Systems and methods of deferred multimedia content delivery are disclosed. In an embodiment, a method is disclosed that includes receiving a request from a first customer premises equipment (CPE) device to receive multimedia content. The method also includes selectively recording the multimedia content at a server based on a comparison of a measured bandwidth associated with the first CPE device and a bandwidth threshold. The method may also include delivering the multimedia content to the first CPE device from a network when measured bandwidth is available.

27 Claims, 5 Drawing Sheets

SYSTEM AND METHOD OF DEFERRING MULTIMEDIA CONTENT DELIVERY

FIELD OF THE DISCLOSURE

The present disclosure is generally related to providing and recording multimedia content.

BACKGROUND

Home television recorders such as video cassette recorders (VCRs) have long enabled viewers to record television programs for later viewing. More recently, home digital video recorders (DVRs) have become increasingly popular due to increased storage capacity and recording quality. In addition, many home DVRs can record multiple programs simultaneously. However, viewers may not be able to record all desired programs due to a limited number of simultaneous recordings. Hence, there is a need for an improved system and method of deferring multimedia content delivery.

DETAILED DESCRIPTION OF THE DRAWINGS

In a particular embodiment, a device is disclosed that includes a memory and an interface to receive data from multiple customer premises equipment (CPE) devices. The device may also include a processor. The memory and the interface may be accessible to the processor. The memory may have instructions to cause the processor to execute a method that includes receiving a request via the interface to provide multimedia content to a first CPE device of the multiple CPE devices. The method may include determining a capability of the first CPE device to receive the multimedia content. The method may further include initiating a recording of the multimedia content when the first CPE device is unable to receive the multimedia content based on the capability.

In another embodiment, a device is disclosed that includes a processor and a network interface accessible to the processor. The device may also include a memory accessible to the processor. The memory may have instructions to cause the processor to execute a method that includes receiving an instruction via a user interface to record scheduled multimedia content. The method may also include sending a request via the network interface to record the scheduled multimedia content at a server of a multimedia content distribution network when a storage size of the multimedia content exceeds an available storage capacity at the device.

In another embodiment, a method is disclosed that includes receiving a request from a first customer premises equipment (CPE) device to receive multimedia content. The method may also include selectively recording the multimedia content at a server based on a comparison of a measured bandwidth associated with the first CPE device and a bandwidth threshold. In a particular embodiment, a measured number of standard definition and high definition video streams may be compared to a threshold number of standard definition and high definition video streams. The measured number may include only standard definition video streams, high definition video streams, or any combination thereof.

In another embodiment, a method is disclosed that includes receiving an instruction at a first customer premise equipment (CPE) device to record multimedia content at the first CPE device. The method may also include sending a request to record the multimedia content at a server of a multimedia content distribution network when a storage size of the multimedia content exceeds an available storage capacity at the first CPE device.

In another embodiment, a computer readable medium is disclosed. The computer readable medium has computer readable instructions to cause a processor to execute a method. The method may include requesting to receive a first number of input streams concurrently from a multimedia content provider network. The first number of input streams exceed a threshold. The method may also include receiving a second number of the input streams that were requested. The second number is less than the first number. The method may further include receiving at least one input stream of the first number of input streams that were requested when at least one of the second number of input streams has terminated.

Figure 1:
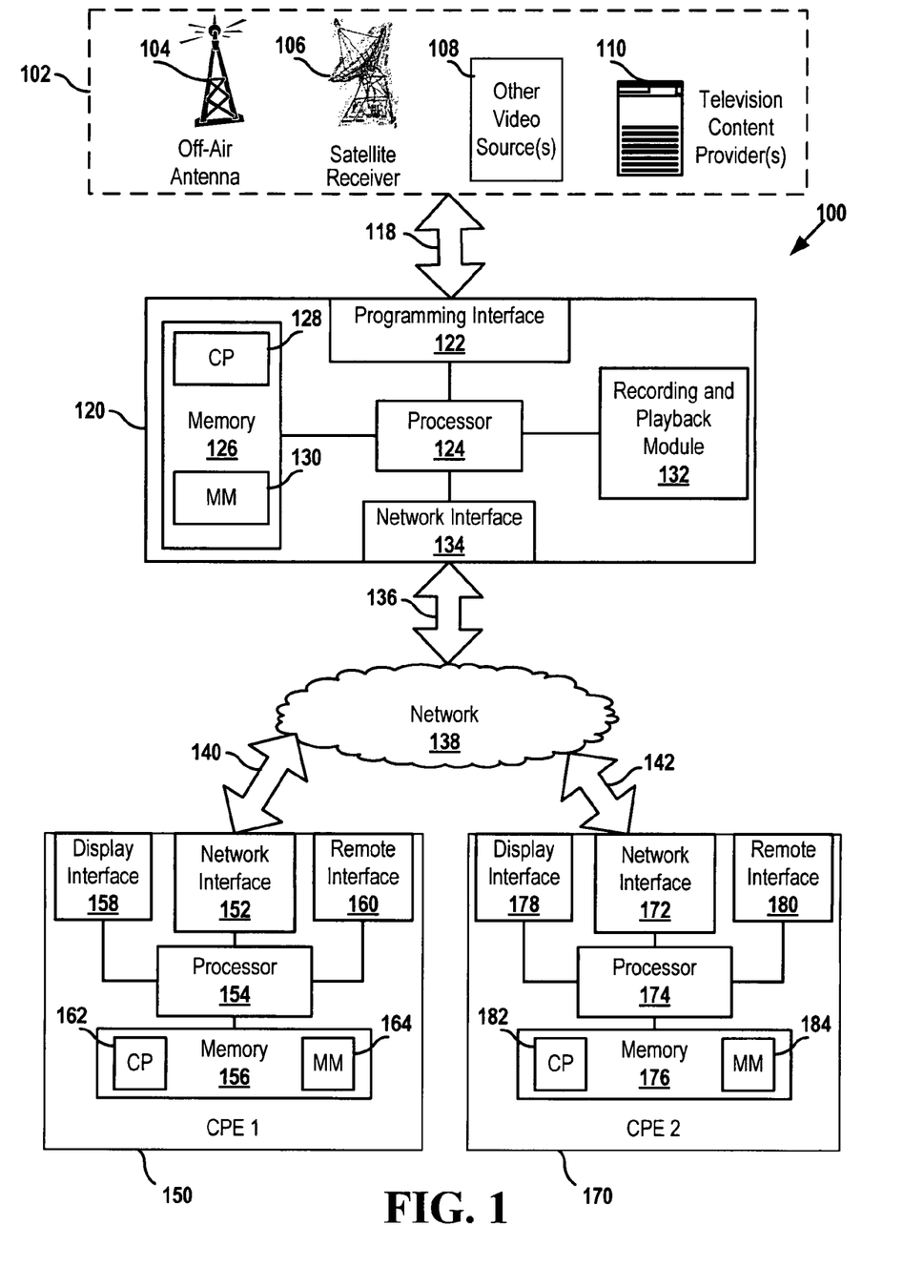
FIG. 1 is a block diagram of a particular embodiment of a system to defer multimedia content delivery.

Referring to FIG. 1, a particular embodiment of a system to defer multimedia content delivery is depicted and generally designated 100. The system 100 includes a multimedia content provider 102 in communication with a multimedia content distribution network that includes a server 120 and an access network 138. The access network 138 is connected to a first customer premises equipment (CPE) device 150 and a second CPE device 170.

In a particular embodiment, the multimedia content source 102 may include an off-air antenna 104, a satellite receiver 106, other video sources 108, television content providers 110, other sources of multimedia content, or any combination thereof. In a particular embodiment, the multimedia content distribution access network may distribute multimedia content data received from the multimedia content provider 102 to the first CPE device 150 and the second CPE device 170 via the access network 138. In a particular embodiment, each of the first CPE device 150 and the second CPE device 170 may provide received multimedia content to one or more subscribers. In a particular embodiment, the CPE devices 150 and 170 may include one or more set-top box devices (STBs) that can be coupled to one or more display devices (not shown). It is understood that the multimedia content distribution network may serve any number of subscribers, and may include any number of CPE devices.

In a particular embodiment, the server 120 may include a programming interface 122, a processor 124, a memory 126, a recording and playback module 132, and a network interface 134. In a particular embodiment, the server 120 may be located at a central or regional head-end or hub office of the multimedia content distribution network.

In a particular embodiment, the programming interface 122 may be configured to receive multimedia content from the multimedia content provider 102 via a communication channel 118. The communication channel 118 may include satellite signals, fiber-optic signals, air-wave broadcast signals, other radio frequency signals, or any combination thereof. The particular format of the multimedia content or the protocol used to send the multimedia content may vary in different embodiments.

In a particular embodiment, the multimedia content may originate from an Internet Protocol Television (IPTV) system. The multimedia content may be ingested from the multimedia content provider 102 and recorded within the IPTV system. The multimedia content may be received and processed by multiple servers of the IPTV system prior to recording. For example, processing the multimedia content may include decoding, encoding, or transcoding of the content between formats.

In a particular embodiment, the memory 126 may include instructions executable by the processor 124, such as one or more computer programs (CP) 128. In a particular embodiment, the memory 126 may store data corresponding to multimedia content (MM) 130. In a particular embodiment, the memory 126 may store one or more scheduled multimedia programs and information associated with one or more CPE devices 150 and 170 requesting the scheduled multimedia programs. The memory 126 may include one or more media storage devices internal to or in communication with the server 120.

In a particular embodiment, the network interface 134 may receive data from multiple CPE devices 150 and 170 via one or more connections 136 to the access network 138. In a particular embodiment, the network interface 134 may send data including multimedia content to one or more CPE devices 150 and 170 via the access network 138.

In a particular embodiment, the recording and playback module 132 may be executable by the processor 124 to receive requests via the network interface 134 to provide multimedia content to one or more of the CPE devices 150 and 170. In a particular embodiment, the recording and playback module 132 may be executable by the processor 124 to determine a capability of a requesting CPE device 150 or 170 to receive the requested multimedia content. The recording and playback module 132 may be executable by the processor 124 to initiate a recording of requested multimedia content when a requesting CPE device 150 or 170 is unable to receive the multimedia content based on the determined capacity of the CPE device 150 or 170. The recording and playback module 132 may be executable by the processor 124 to provide requested multimedia content via the network interface 134 to a CPE device 150 or 170 when it is determined that the CPE device has sufficient capacity to receive the multimedia content.

In a particular embodiment, the first CPE device 150 may include a network interface 152, a processor 154, a memory 156, a display interface 158, and a remote interface 160. In a particular embodiment, the first CPE device 150 may communicate with the access network 138 via the network interface 152 and one or more connections 140. In a particular embodiment, the first CPE device 150 may communicate with one or more remote control devices (not shown) via the remote interface 160. In a particular embodiment, the memory 156 may include instructions executable by the processor 154, such as one or more computer programs (CP) 162.

In a particular embodiment, the first CPE 150 may receive multimedia content via the network interface 152. Received multimedia content may be provided to a subscriber via a display device (not shown) coupled to the display interface 158 or stored as multimedia data (MM) 164 at the memory 156. In a particular embodiment, the memory 156 may include one or more internal or external media storage devices, such as a digital video recorder (DVR).

In a particular embodiment, the second CPE device 170 may include a network interface 172, a processor 174, a memory 176, a display interface 178, and a remote interface 180. In a particular embodiment, the second CPE device 170 may communicate with the access network 138 via the network interface 172 and one or more connections 142.

In a particular embodiment, each CPE device 150 and 170 may have a restricted input bandwidth determined by one or more bandwidth thresholds. A bandwidth threshold may be determined based on a capacity of the connection 140 or 142, by a provider of the connection, by a provider of the multimedia content distribution network, by a processing capability of the CPE device 150 or 170, or any combination thereof. In a particular embodiment, a bandwidth threshold may be based on input bit rate, a number of input streams, a resolution of input data such as a high-definition signal, or any combination thereof.

The first CPE device 150 may be configured to receive an instruction from a subscriber to receive multimedia content, such as by selection of one or more selectable options of a user interface. In a particular embodiment, the CPE device 150 may be configured to provide a selectable electronic program guide (EPG) user interface to display available multimedia content, such as television programs, via the display interface 158 and to receive navigation and selection commands from a remote control device via the remote interface 160. The first CPE device 150 may be configured to receive user instructions to display one or more selected programs, to record one or more selected programs to the memory 156, or any combination thereof. In a particular embodiment, the first CPE device 150 may be configured to receive instructions to schedule recording of one or more future multimedia content selections.

In a particular embodiment, the first CPE device 150 may be configured to determine whether a storage size of the selected multimedia content exceeds available storage capacity at the memory 156 when the first CPE device 150 receives an instruction to record selected multimedia content. In a particular embodiment, the storage capacity may represent memory available for recording multimedia content, and may not represent a total capacity of memory 156. If the memory 156 does not have sufficient storage capacity to record the selected multimedia content, the first CPE device 150 may send a request to the server 120 to record the selected multimedia content at a location other than at the first CPE device 150. The memory 156 may include one or more types of data storage, such as non-volatile solid state storage, magnetic storage, such as disc drive storage, optical storage, or any combination thereof.

In a particular embodiment, the server 120 may be configured to receive the request and initiate a recording of the multimedia content. In a particular embodiment, the multimedia content may be stored at the memory 126 or at another storage device of the multimedia content distribution network. In a particular embodiment, the server 120 may be configured to initiate recording of the multimedia content at another CPE device, such as the second CPE device 170, for later transfer to the first CPE device 150.

In a particular embodiment, the server 120 may be configured to initiate sending the recorded multimedia content to the first CPE device 150 when the first CPE device 150 has sufficient capability to receive the recorded multimedia content, such as having sufficient input bandwidth and storage capacity. In a particular embodiment, the server 120 may be configured to monitor and determine the input bandwidth, the storage capacity, or any combination thereof, associated with the first CPE device 150. In a particular embodiment the first CPE device 120, the server 120, other devices of the multimedia content distribution network, or any combination thereof, may be configured to monitor and determine the input bandwidth, the storage capacity, or any combination thereof, associated with the first CPE device 150.

In a particular embodiment, the server 120 may initiate sending the recorded multimedia content to the first CPE device 150 automatically when the first CPE device 150 is determined to have sufficient input bandwidth and storage capacity. In another embodiment, the server 120 may initiate sending the recorded multimedia content in response to a request from the first CPE device 150. The first CPE device 150 may store the multimedia content at the memory 156 for later playback to the user.

In a particular embodiment, the server 120 may be configured to initiate sending the requested multimedia content to the first CPE device 150 at a first bit rate when the first CPE device 150 is receiving multiple input streams. When one or more of the multiple input streams terminates, additional input bandwidth to the first CPE device 150 may become available, and the server 120 may initiate sending the remaining requested multimedia content at a second bit rate that is higher than the first bit rate. In a particular embodiment, the first CPE device 150 may be configured to receive a first portion of the requested multimedia content at the first bit rate and a second portion at the second bit rate.

In another embodiment, the server 120 may be configured to store the recorded multimedia content for later playback. The server 120 may be configured to receive and respond to playback instructions from the first CPE device 150 corresponding to user playback commands received at the first CPE device 150. For example, the first CPE device 150 may receive a play command from a user, and may in response signal the server 120 to begin playback of the recorded multimedia content. The server 120 may respond by streaming the recorded content to the first CPE device 150 for display to the user.

Figure 2:
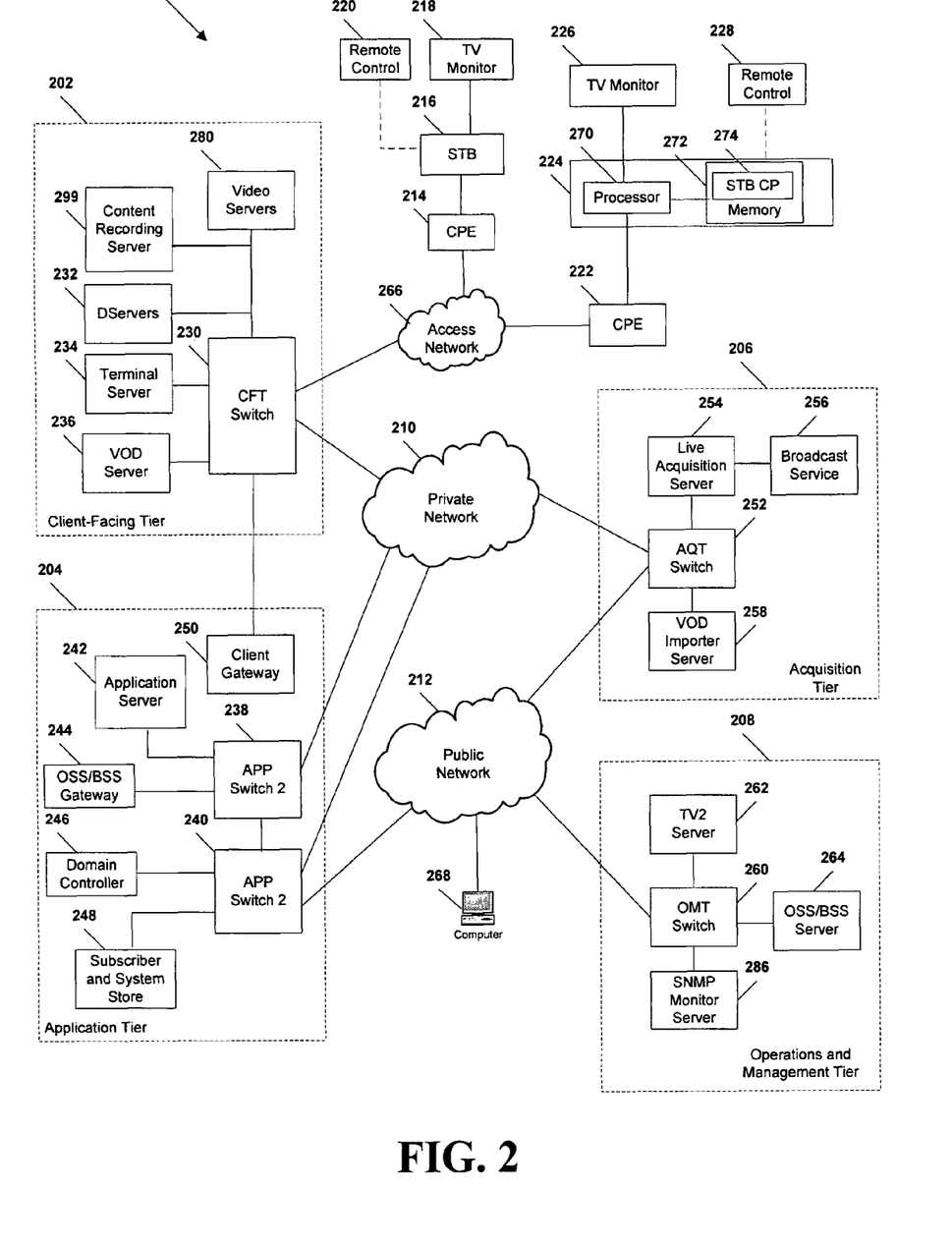
FIG. 2 is a block diagram of a second particular embodiment of a system to defer multimedia content delivery.

Referring to FIG. 2, an illustrative embodiment of an Internet Protocol Television (IPTV) system that may be used to defer multimedia content delivery is illustrated and is generally designated 200. As shown, the system 200 can include a client facing tier 202, an application tier 204, an acquisition tier 206, and an operations and management tier 208. Each tier 202, 204, 206, 208 is coupled to a private network 210; to a public network 212, such as the Internet; or to both the private network 210 and the public network 212. For example, the client-facing tier 202 can be coupled to the private network 210. Further, the application tier 204 can be coupled to the private network 210 and to the public network 212. The acquisition tier 206 can also be coupled to the private network 210 and to the public network 212. Additionally, the operations and management tier 208 can be coupled to the public network 212.

As illustrated in FIG. 2, the various tiers 202, 204, 206, 208 communicate with each other via the private network 210 and the public network 212. For instance, the client-facing tier 202 can communicate with the application tier 204 and the acquisition tier 206 via the private network 210. The application tier 204 can communicate with the acquisition tier 206 via the private network 210. Further, the application tier 204 can communicate with the acquisition tier 206 and the operations and management tier 208 via the public network 212. Moreover, the acquisition tier 206 can communicate with the operations and management tier 208 via the public network 212. In a particular embodiment, elements of the application tier 204, including, but not limited to, a client gateway 250, can communicate directly with the client-facing tier 202.

The client-facing tier 202 can communicate with user equipment via an access network 266, such as an Internet Protocol Television (IPTV) access network. In an illustrative embodiment, customer premises equipment (CPE) 214, 222 can be coupled to a local switch, router, or other device of the access network 266. The client-facing tier 202 can communicate with a first representative set-top box device 216 via the first CPE 214 and with a second representative set-top box device 224 via the second CPE 222. In a particular embodiment, the first representative set-top box device 216 and the first CPE 214 can be located at a first customer premise, and the second representative set-top box device 224 and the second CPE 222 can be located at a second customer premise. In another particular embodiment, the first representative set-top box device 216 and the second representative set-top box device 224 can be located at a single customer premise, both coupled to one of the CPE 214, 222. The CPE 214, 222 can include routers, local area network devices, modems, such as digital subscriber line (DSL) modems, any other suitable devices for facilitating communication between a set-top box device and the access network 266, or any combination thereof. In a particular embodiment, the CPE 214, 222 can include the set-top box devices 216 and 224, respectively.

In an exemplary embodiment, the client-facing tier 202 can be coupled to the CPE 214, 222 via fiber optic cables. In another exemplary embodiment, the CPE 214, 222 can be digital subscriber line (DSL) modems that are coupled to one or more network nodes via twisted pairs, and the client-facing, tier 202 can be coupled to the network nodes via fiber-optic cables. Each set-top box device 216, 224 can process data received via the access network 266, via an IPTV software platform, such as Microsoft® TV IPTV Edition.

The first set-top box device 216 can be coupled to a first external display device, such as a first television monitor 218, and the second set-top box device 224 can be coupled to a second external display device, such as a second television monitor 226. Moreover, the first set-top box device 216 can communicate with a first remote control 220, and the second set-top box device 224 can communicate with a second remote control 228. The set-top box devices 216, 224 can include IPTV set-top box devices; video gaming devices or consoles that are adapted to receive IPTV content; personal computers or other computing devices that are adapted to emulate set-top box device functionalities; any other device adapted to receive IPTV content and transmit data to an IPTV system via an access network; or any combination thereof.

In an exemplary, non-limiting embodiment, each set-top box device 216, 224 can receive data, video, or any combination thereof, from the client-facing tier 202 via the access network 266 and render or display the data, video, or any combination thereof, at the display device 218, 226 to which it is coupled. In an illustrative embodiment, the set-top box devices 216, 224 can include tuners that receive and decode television programming signals or packet streams for transmission to the display devices 218, 226. Further, the set-top box devices 216, 224 can include a STB processor 270 and a STB memory device 272 that is accessible to the STB processor 270. In one embodiment, a computer program, such as the STB computer program 274, can be embedded within the STB memory device 272.

In an illustrative embodiment, the client-facing tier 202 can include a client-facing tier (CFT) switch 230 that manages communication between the client-facing tier 202 and the access network 266 and between the client-facing tier 202 and the private network 210. As illustrated, the CFT switch 230 is coupled to one or more data servers, such as D-servers 232, that store, format, encode, replicate, or otherwise manipulate or prepare video content for communication from the client-facing tier 202 to the set-top box devices 216, 224. The CFT switch 230 can also be coupled to a terminal server 234 that provides terminal devices with a point of connection to the IPTV system 200 via the client-facing tier 202. In a particular embodiment, the CFT switch 230 can be coupled to a video-on-demand (VOD) server 236 that stores or provides VOD content imported by the IPTV system 200. Further, the CFT switch 230 is coupled to one or more video servers 280 that receive video content and transmit the content to the set-top boxes 216, 224 via the access network 266. In a particular embodiment, the CFT switch 230 may be coupled to a content recording server 299, such as the server 120 depicted in FIG. 1.

In an illustrative embodiment, the client-facing tier 202 can communicate with a large number of set-top boxes, such as the representative set-top boxes 216, 224, over a wide geographic area, such as a metropolitan area, a viewing area, a statewide area, a regional area, a nationwide area or any other suitable geographic area, market area, or subscriber or customer group that can be supported by networking the client-facing tier 202 to numerous set-top box devices. In a particular embodiment, the CFT switch 230, or any portion thereof, can include a multicast router or switch that communicates with multiple set-top box devices via a multicast-enabled network.

As illustrated in FIG. 2, the application tier 204 can communicate with both the private network 210 and the public network 212. The application tier 204 can include a first application tier (APP) switch 238 and a second APP switch 240. In a particular embodiment, the first APP switch 238 can be coupled to the second APP switch 240. The first APP switch 238 can be coupled to an application server 242 and to an OSS/BSS gateway 244. In a particular embodiment, the application server 242 can provide applications to the set-top box devices 216, 224 via the access network 266, which enable the set-top box devices 216, 224 to provide functions, such as interactive program guides, video gaming/display, messaging, processing of VOD material and other IPTV content, etc. In an illustrative embodiment, the application server 242 can provide location information to the set-top box devices 216, 224. In a particular embodiment, the OSS/BSS gateway 244 includes operation systems and support (OSS) data, as well as billing systems and support (BSS) data. In one embodiment, the OSS/BSS gateway 244 can provide or restrict access to an OSS/BSS server 264 that stores operations and billing systems data.

The second APP switch 240 can be coupled to a domain controller 246 that provides Internet access, for example, to users at their computers 268 via the public network 212. For example, the domain controller 246 can provide remote Internet access to IPTV account information, e-mail, personalized Internet services, or other online services via the public network 212. In addition, the second APP switch 240 can be coupled to a subscriber and system store 248 that includes account information, such as account information that is associated with users who access the IPTV system 200 via the private network 210 or the public network 212. In an illustrative embodiment, the subscriber and system store 248 can store subscriber or customer data and create subscriber or customer profiles that are associated with IP addresses, stock-keeping unit (SKU) numbers, other identifiers, or any combination thereof, of corresponding set-top box devices 216, 224. In another illustrative embodiment, the subscriber and system store 248 can store data associated with capabilities of set-top box devices associated with particular customers.

In a particular embodiment, the application tier 204 can include a client gateway 250 that communicates data directly to the client-facing tier 202. In this embodiment, the client gateway 250 can be coupled directly to the CFT switch 230. The client gateway 250 can provide user access to the private network 210 and the tiers coupled thereto. In an illustrative embodiment, the set-top box devices 216, 224 can access the IPTV system 200 via the access network 266, using information received from the client gateway 250. User devices can access the client gateway 250 via the access network 266, and the client gateway 250 can allow such devices to access the private network 210 once the devices are authenticated or verified. Similarly, the client gateway 250 can prevent unauthorized devices, such as hacker computers or stolen set-top box devices from accessing the private network 210, by denying access to these devices beyond the access network 266.

For example, when the first representative set-top box device 216 accesses the client-facing tier 202 via the access network 266, the client gateway 250 can verify subscriber information by communicating with the subscriber and system store 248 via the private network 210. Further, the client gateway 250 can verify billing information and status by communicating with the OSS/BSS gateway 244 via the private network 210. In one embodiment, the OSS/BSS gateway 244 can transmit a query via the public network 212 to the OSS/BSS server 264. After the client gateway 250 confirms subscriber and/or billing information, the client gateway 250 can allow the set-top box device 216 to access IPTV content and VOD content at the client-facing tier 202. If the client gateway 250 cannot verify subscriber information for the set-top box device 216, e.g., because it is connected to an unauthorized twisted pair, the client gateway 250 can block transmissions to and from the set-top box device 216 beyond the access network 266.

As indicated in FIG. 2, the acquisition tier 206 includes an acquisition tier (AQT) switch 252 that communicates with the private network 210. The AQT switch 252 can also communicate with the operations and management tier 208 via the public network 212. In a particular embodiment, the AQT switch 252 can be coupled to a live acquisition server 254 that receives or acquires television content, movie content, advertisement content, other video content, or any combination thereof, from a broadcast service 256, such as a satellite acquisition system or satellite head-end office. In a particular embodiment, the live acquisition server 254 can transmit content to the AQT switch 252, and the AQT switch 252 can transmit the content to the CFT switch 230 via the private network 210.

In an illustrative embodiment, content can be transmitted to the D-servers 232, where it can be encoded, formatted, stored, replicated, or otherwise manipulated and prepared for communication from the video server(s) 280 to the set-top box devices 216, 224. The CFT switch 230 can receive content from the video server(s) 280 and communicate the content to the CPE 214, 222 via the access network 266. The set-top box devices 216, 224 can receive the content via the CPE 214, 222, and can transmit the content to the television monitors 218, 226. In an illustrative embodiment, video or audio portions of the content can be streamed to the set-top box devices 216, 224.

In an illustrative embodiment, content can be transmitted to the content recording server 299, where it can be encoded, formatted, stored, replicated, or otherwise manipulated and prepared for retention in a memory.

Further, the AQT switch 252 can be coupled to a video-on-demand importer server 258 that receives and stores television or movie content received at the acquisition tier 206 and communicates the stored content to the VOD server 236 at the client-facing tier 202 via the private network 210. Additionally, at the acquisition tier 206, the video-on-demand (VOD) importer server 258 can receive content from one or more VOD sources outside the IPTV system 200, such as movie studios and programmers of non-live content. The VOD importer server 258 can transmit the VOD content to the AQT switch 252, and the AQT switch 252, in turn, can communicate the material to the CFT switch 230 via the private network 210. The VOD content can be stored at one or more servers, such as the VOD server 236.

When users issue requests for VOD content via the set-top box devices 216, 224, the requests can be transmitted over the access network 266 to the VOD server 236, via the CFT switch 230; Upon receiving such requests, the VOD server 236 can retrieve the requested VOD content and transmit the content to the set-top box devices 216,124 across the access network 266, via the CFT switch 230. The set-top box devices 216, 224 can transmit the VOD content to the television monitors 218, 226. In an illustrative embodiment, video or audio portions of VOD content can be streamed to the set-top box devices 216, 224.

FIG. 2 further illustrates that the operations and management tier 208 can include an operations and management tier (OMT) switch 260 that conducts communication between the operations and management tier 208 and the public network 212. In the embodiment illustrated by FIG. 2, the OMT switch 260 is coupled to a TV2 server 262. Additionally, the OMT switch 260 can be coupled to an OSS/BSS server 264 and to a simple network management protocol (SNMP) monitor 286 that monitors network devices within or coupled to the IPTV system 200. In a particular embodiment, the OMT switch 260 can communicate with the AQT switch 252 via the public network 212.

In an illustrative embodiment, the live acquisition server 254 can transmit content to the AQT switch 252, and the AQT switch 252, in turn, can transmit the content to the OMT switch 260 via the public network 212. In this embodiment, the OMT switch 260 can transmit the content to the TV2 server 262 for display to users accessing the user interface at the TV2 server 262. For example, a user can access the TV2 server 262 using a personal computer 268 coupled to the public network 212. In an illustrative embodiment, a user may communicate a recording request via the first representative STB device 216 using the remote control 220. The first representative STB device 216 may communicate the recording request to the content recording server 299 via the CPE 214, the access network 266, and the CFT switch 230. The content recording server 299 may initiate recording the requested content for later transfer to a memory coupled to the CPE 214, such as a DVR (not shown).

In an illustrative embodiment, a user may communicate one or more requests via the CPE 214 to receive multiple concurrent input streams. For example, a user may request to record multiple scheduled programs simultaneously at a DVR coupled to the CPE 214 while receiving another program for viewing at the TV monitor 218. If the number of requested input streams exceeds a threshold for the CPE 214, the CPE 214 may receive some, but not all, of the requested input streams, and the content recording server 299 may initiate storage of the remaining requested content for later transfer to the CPE 214. When at least one of the input streams to the CPE 214 has terminated, the content recording server 299 may initiate one or more streams to the CPE 214 to transfer the stored content to the CPE 214.

In an illustrative embodiment, the content storage server 299 may monitor a capability of the CPE 214 to receive requested multimedia content. In a particular embodiment, the content storage server 299 may initiate sending stored content when the CPE 214 has available input bandwidth. In a particular embodiment, when the stored content is requested for storing at a memory coupled to the CPE 214, the content storage server 299 may initiate sending the stored content when the CPE 214 has available input bandwidth and available storage space.

In a particular embodiment, limits on input streams to a subscriber, such as to the CPE 214, may be addressed by allocating "virtual streams" to locations outside a subscriber's premises that do not count toward bandwidth used by the subscriber. The "virtual streams" may enable deferred multimedia content delivery to a subscriber's DVR, via network deferred recording. Network deferred recording may include recording the multimedia content at a memory of a provider network and later transferring the content to the subscriber's CPE, such as the CPE 214, the set-top box device 216, a receiver, DVR, or any combination thereof, as bandwidth becomes available. In a particular embodiment, the deferred recording and delivery to a customer's CPE may be unnoticeable to the customer, other than via a delay introduced by the deferred delivery.

In a particular embodiment, a customer may be provided an inventory of available recordings that distinguishes local recordings from network deferred recordings, such as a menu displayed at the TV monitor 218. In a particular embodiment, an inventory of recordings available to a customer may distinguish network deferred recordings when pending network deferred recording, when recording on the network, when pending transfer to the customer's CPE, and when transferring to the customer's CPE, as not being available for immediate viewing.

In a particular embodiment, a network load balance may be improved by deferring delivery of multimedia content. For example, peak content demand, such as for popular programs, may be reduced as the content is distributed over a longer time period. In a particular embodiment, a provider of the multimedia content may determine particular content, such as a number of the most popular content selections, to always be recorded at the network, such as via the content recording server 299. In a particular embodiment, deferred content delivery may reduce stream conflict issues. In a particular embodiment, recording of the requested content may occur at the network and be later transferred to requesting CPE devices via a schedule IP multicast. In a particular embodiment, recording of requested multimedia content may occur at a single CPE device, such as at the CPE 214, and later distributed in a peer-to-peer arrangement to one or more subscribers that also requested to record the content, such as to the CPE 222 via the access network 266.

In a particular embodiment, a network deferred delivery schedule of recorded content may be available to a service provider to indicate content to be delivered, accounts to receive delivery, scheduled delivery times, number of allowed delivery attempts, any other information relating, other information relating to deferred content delivery, or any combination thereof. In a particular embodiment, data relating to deferred content delivery may be stored and made available to service providers. In a particular embodiment, the data may include deferred recording and delivery activities at an account level and aggregated to an overall user base level by program name, program time slot, program duration, channel, Video Head-End Office (VHO), program rating, current stream usage profile by account, current network deferred usage profile by account, number of overall requests for the program, other deferred recording and delivery information, or any combination thereof.

In a particular embodiment, content may be designated ahead of time to be automatically recorded on the network. In a particular embodiment, if a customer records locally a portion of a scheduled multimedia content selection after the scheduled start time, and if a full recording of the multimedia content selection has been recorded via network deferred recording initiated by the multimedia content provider or by another customer, the entire network deferred recording may automatically be transferred to the customer. The customer may have access to view the partial recoding until the full recording is available for playback. In a particular embodiment, after the full recording is transferred, metadata associated with the partial recording may be updated to indicate the full recording is available.

In a particular embodiment, if the partial recording is deleted before the full recording is transferred, the full recording may not be transferred to the customer. In a particular embodiment, the customer may not be informed that the partial recording will be replaced by a full recording. In a particular embodiment, the replacement of partial recordings with full network deferred recordings may be configurable based on the content type, the customer account options, content provider policies, other content, customer, or system characteristics, or any combination thereof.

In a particular embodiment, content may be designated to be recorded on the network if a limit to a number of network deferred recordings available to the customer has not been exceeded. A customer may have access to manage pending recordings (that may or may not occur on the network), such as via a graphical user interface at the customer's television, network-enabled mobile phone, other network-enabled electronic device, or any combination thereof. The customer may mange pending recordings by canceling a pending recording, by swapping standard scheduled recordings with network deferred scheduled recordings, and by managing conflicts between network deferred and standard recordings, such as having too many recordings scheduled, or too many network deferred recordings scheduled.

In a particular embodiment, during or after a network deferred recording, the content may be displayed as an inventory of available content that is not yet available for viewing. In a particular embodiment, if a customer elects to cancel or delete the recording, the recording may be removed from the customer's inventory of available recordings but remain available for deferred transfer to other customers. In a particular embodiment, if a customer elects to delete a deferred recording while the recording is being transferred to a customer's receiver, the transfer may be cancelled and the portion that was transferred may not be available for viewing by the customer.

In a particular embodiment, when a customer attempts to receive content for viewing when all input streams are in use, the customer may be presented with options to record the content via network deferred recording, to view one of the streams currently being received, to watch recorded content stored at the customer's CPE, or to interrupt a stream currently in use. In a particular embodiment, when a customer attempts to immediately record content when all streams are in use, network deferred recording of the content may begin automatically. However, if a limit to a number of network deferred recordings available to the customer would be exceeded, the customer may be presented with options to not record the content or to resolve recording conflicts. In a particular embodiment, if a scheduled recording would exceed a limit of input streams as well as a limit of network deferred recordings, the customer may be presented with options to not record the content or to resolve recording conflicts.

In a particular embodiment, if all input streams to a customer are in use when a scheduled recording is to begin, including streams for recording and streams for live viewing, and in addition a limit of network deferred recordings has also been met, then a stream for live viewing may be interrupted to record the scheduled content at the customer's CPE. In a particular embodiment, a customer may not be permitted to switch from local recording to network deferred recording after the recording has begun.

In a particular embodiment, if all input streams to a customer are in use, including a program-based scheduled recording, when a time-based scheduled recording is to begin, one of the program-based scheduled recordings may be automatically transferred to a network deferred recording so that the time-based recording may occur locally.

In a particular embodiment, a network deferred recording may be determined to be undeliverable after a number of failed transfer attempts to the customer's CPE has reached a limit. For example, if the customer's CPE is unplugged, has insufficient memory capacity, or no input streams are available during each transfer attempt, the recording may be determined to be undeliverable. In a particular embodiment, recordings determined to be undeliverable to a customer may be inaccessible to the customer. In a particular embodiment, an inventory of recordings available to the customer may indicate undeliverable recordings and an associated error message.

In a particular embodiment, "trick modes" may be disabled for at least a portion of network deferred recording content. For example, content having trick modes may require excessive storage capacity to store files associated with fast-forward and rewind. In a particular embodiment, at least a portion of the multimedia content may be configurable to not be recordable via network deferred recording. In a particular embodiment, when there is a simultaneous substitution blackout during a network deferred recording, the customer may receive the substituted recording. In a particular embodiment, if there is an alternate event or blackout in which a placard is delivered to the customer, the alternate event or the placard may not be stored via network deferred recording, and instead the customer may receive an error indicator at the customer's inventory of available recordings indicating the content is unavailable due to blackout. In a particular embodiment, network deferred recording content may have a separate set of configuration parameters for Copy Generation Management System Analogue (CGMS-A).

Figure 3:
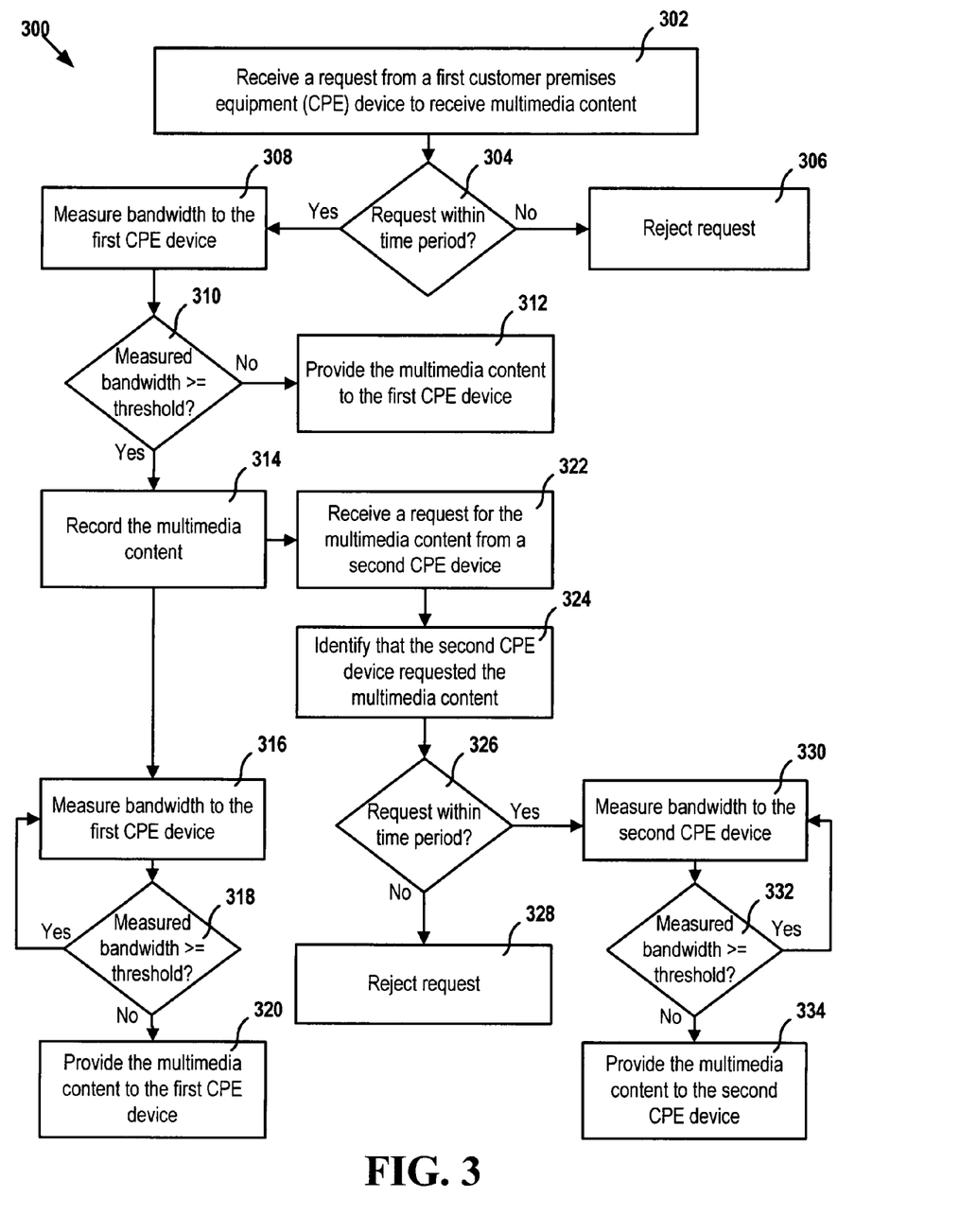
FIG. 3 is a flow chart of a particular embodiment of a method of deferring multimedia content delivery.

Referring to FIG. 3, a flow chart of a particular illustrative embodiment of a method of deferring multimedia content delivery is depicted and generally designated 300. A request may be received from a first customer premises equipment (CPE) device to receive multimedia content, at 302. In a particular embodiment, the first CPE device may be a CPE device depicted in FIG. 1 or 2. In a particular embodiment, the request may be received at a server such as the server 120 of FIG. 1 or the content recording server 299 of FIG. 2.

In a particular embodiment, a determination of whether the request is within a time period may be made, at 304. In a particular embodiment, the time period may be a first time period prior to a scheduled start of the multimedia content. In a particular embodiment, the time period may be a second time period that is within an amount of time from the scheduled start that is less than a total scheduled time of the multimedia content. In a particular embodiment, the time period may be a third time period that is prior to a scheduled end of the multimedia content. In a particular embodiment, the request may be rejected when the request is not within the time period, at 306.

In a particular embodiment, when the request is within the time period, bandwidth to the first CPE device may be measured, at 308. In a particular embodiment, the measured bandwidth to the first CPE device may be compared to a bandwidth threshold, at 310. In a particular embodiment, the bandwidth threshold may include a number of concurrent multimedia streams to the first CPE device. In a particular embodiment, the number of concurrent multimedia streams may be modified based on a bit rate of each stream being provided to the first CPE device. In a particular embodiment, when the measured bandwidth is not greater than or equal to the bandwidth threshold, the multimedia content may be provided to the first CPE device, at 312.

In a particular embodiment, when the measured bandwidth is greater than or equal to the bandwidth threshold, the multimedia content may be recorded at a server, at 314. In a particular embodiment, the server may be adapted to distribute the multimedia content to multiple CPE devices.

In a particular embodiment, bandwidth to the first CPE device may be measured, at 316. In a particular embodiment, the measured bandwidth to the first CPE device may be compared to a bandwidth threshold, at 318. In a particular embodiment, bandwidth measurement at 316 and comparison to the bandwidth threshold at 318 may repeat while the measured bandwidth is greater than or equal to the bandwidth threshold.

In a particular embodiment, when the measured bandwidth to the first CPE device no longer exceeds the bandwidth threshold, the multimedia content may be provided to the first CPE device, at 320. In a particular embodiment, the multimedia content may be provided to the first CPE device without a subsequent request from the first CPE device. In a particular embodiment, access to the multimedia content may be provided only to the first CPE device.

In a particular embodiment, requests for the multimedia content may be received from multiple CPE devices. In a particular embodiment, a request for the multimedia content may be received from at second CPE device, at 322. In a particular embodiment, an identification that the second CPE device has requested the multimedia content may be made, at 324.

In a particular embodiment, a determination whether the request from the second CPE device is within a time period may be made, at 326. In a particular embodiment, the time period may be a first time period prior to a scheduled start of the multimedia content. In a particular embodiment, the time period may be a second time period that is within an amount of time from the scheduled start that is less than a total scheduled time of the multimedia content. In a particular embodiment, the time period may be a third time period that is prior to a scheduled end of the multimedia content. In a particular embodiment, when the request from the second CPE device is not within the time period, the request may be rejected, at 328.

In a particular embodiment, bandwidth to the second CPE device may be measured, at 330. In a particular embodiment, the measured bandwidth to the second CPE device may be compared to a bandwidth threshold, at 332. In a particular embodiment, bandwidth measurement at 330 and comparison to the bandwidth threshold at 332 may repeat while the measured bandwidth to the second CPE device is greater than or equal to the bandwidth threshold.

In a particular embodiment, when the measured bandwidth to the second CPE device no longer exceeds the bandwidth threshold, the multimedia content may be provided to the second CPE device, at 334. In a particular embodiment, the multimedia content may be provided to the second CPE device independent of the first CPE device. In a particular embodiment, the multimedia content may be delivered to the second CPE device based on a predefined interval.

Figure 4:
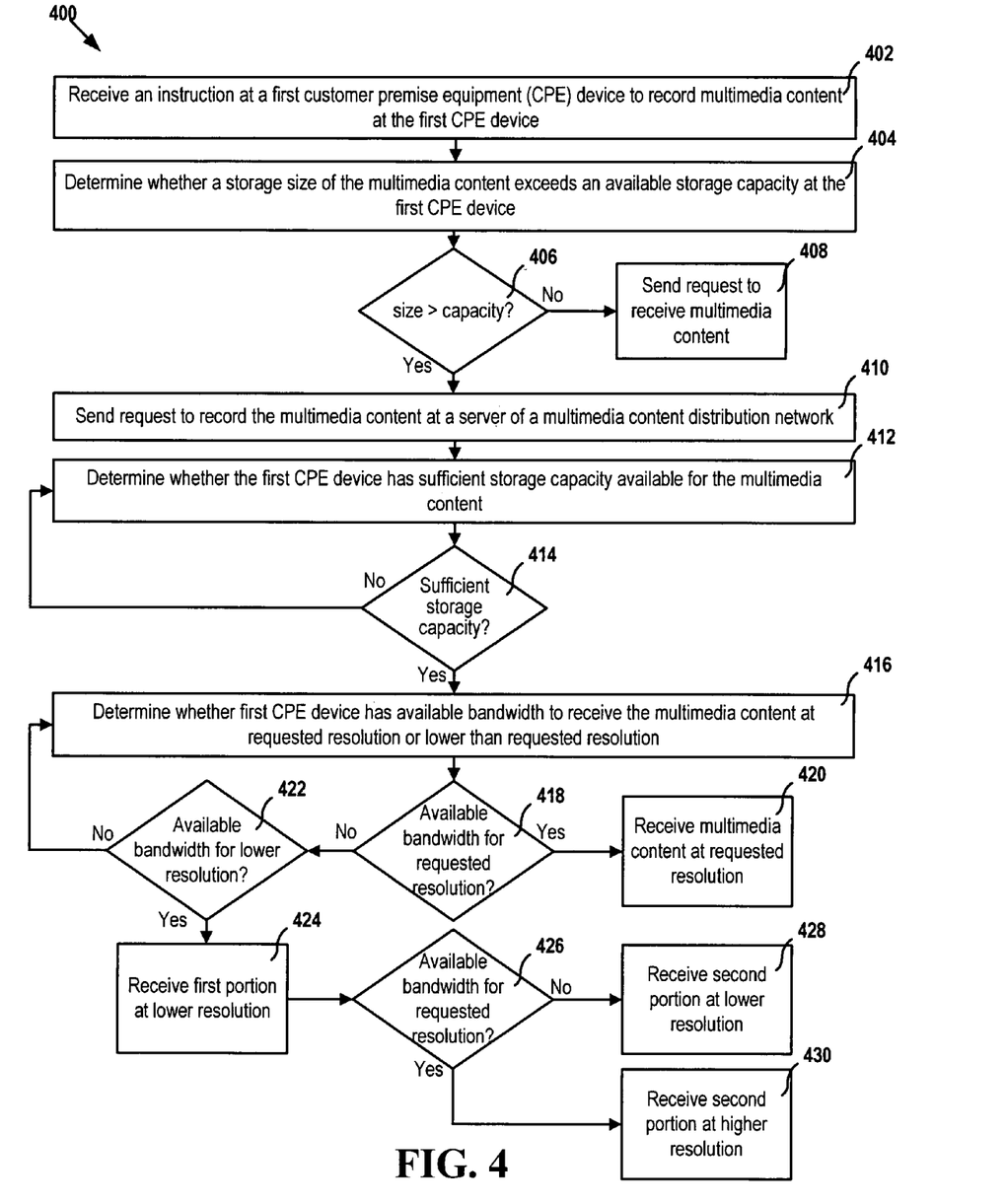
FIG. 4 is a flow chart of a second particular embodiment of a method of deferring multimedia content delivery.

Referring to FIG. 4, a flow chart of a second particular embodiment of a method of deferring multimedia content delivery is depicted and generally designated 400. An instruction may be received at a first customer premise equipment (CPE) device to record multimedia content at the first CPE device, at 402. In a particular embodiment, the instruction may be received from a user via a remote control device. In a particular embodiment, the first CPE device may be a CPE device depicted in FIG. 1 or 2.

In a particular embodiment, a determination may be made whether a storage size of the multimedia content exceeds an available storage capacity at the first CPE device, at 404. In a particular embodiment, when the storage size does not exceed the available storage capacity, at 406, a request may be sent to receive the multimedia content, at 408.

In a particular embodiment, when the storage size exceeds the available storage capacity, a request may be sent to record the multimedia content at a server of a multimedia content distribution network, at 410. In a particular embodiment, the request may be sent to a server such as the server 120 of FIG. 1 or the content recording server 299 of FIG. 2.

In a particular embodiment, a determination may be made whether the first CPE device has sufficient storage capacity available for the content, at 412. In a particular embodiment, when the first CPE device does not have sufficient storage capacity, at 414, the determination may repeat while the first CPE device does not have sufficient storage capacity.

In a particular embodiment, when the first CPE device is determined to have sufficient storage capacity, a determination may be made whether the first CPE device has available bandwidth to receive the multimedia content at a requested resolution or at a lower than requested resolution, at 416. In a particular embodiment, when the first CPE device has available bandwidth for the requested resolution, at 418, the multimedia content may be received at the requested resolution, at 420.

In a particular embodiment, when the first CPE device does not have available bandwidth for the requested resolution, at 418, or for lower than the requested resolution, at 422, another determination whether the first CPE device has available bandwidth may be made, at 416. In a particular embodiment, when the first CPE device has available bandwidth for lower than requested resolution, at 412, the first CPE device may receive a first portion of the multimedia content at the lower resolution, at 424.

In a particular embodiment, when the first CPE device does not have available bandwidth for the requested resolution, at 426, the first CPE device may receive a second portion of the multimedia content at the lower resolution, at 428. When the first CPE device has available bandwidth for the requested resolution, the first CPE device may receive a second portion of the multimedia content a higher resolution, at 430.

In conjunction with the disclosed systems and methods, multimedia content delivery may be deferred based on capabilities of a subscriber's CPE. In a particular embodiment, multimedia content requested for delivery to a subscriber may be recorded at a location remote from the subscriber and later transferred to the subscriber's CPE when the CPE is determined to have adequate capability to receive the multimedia. In a particular embodiment, multimedia content delivery may be deferred based on a bandwidth associated with the CPE. In a particular embodiment, the bandwidth may be based on a number of input streams, whether the input streams are high-definition steams, an input bit rate to the CPE, or any combination thereof. In a particular embodiment, multimedia content delivery may be deferred based on an available storage capacity at the CPE.

Figure 5:
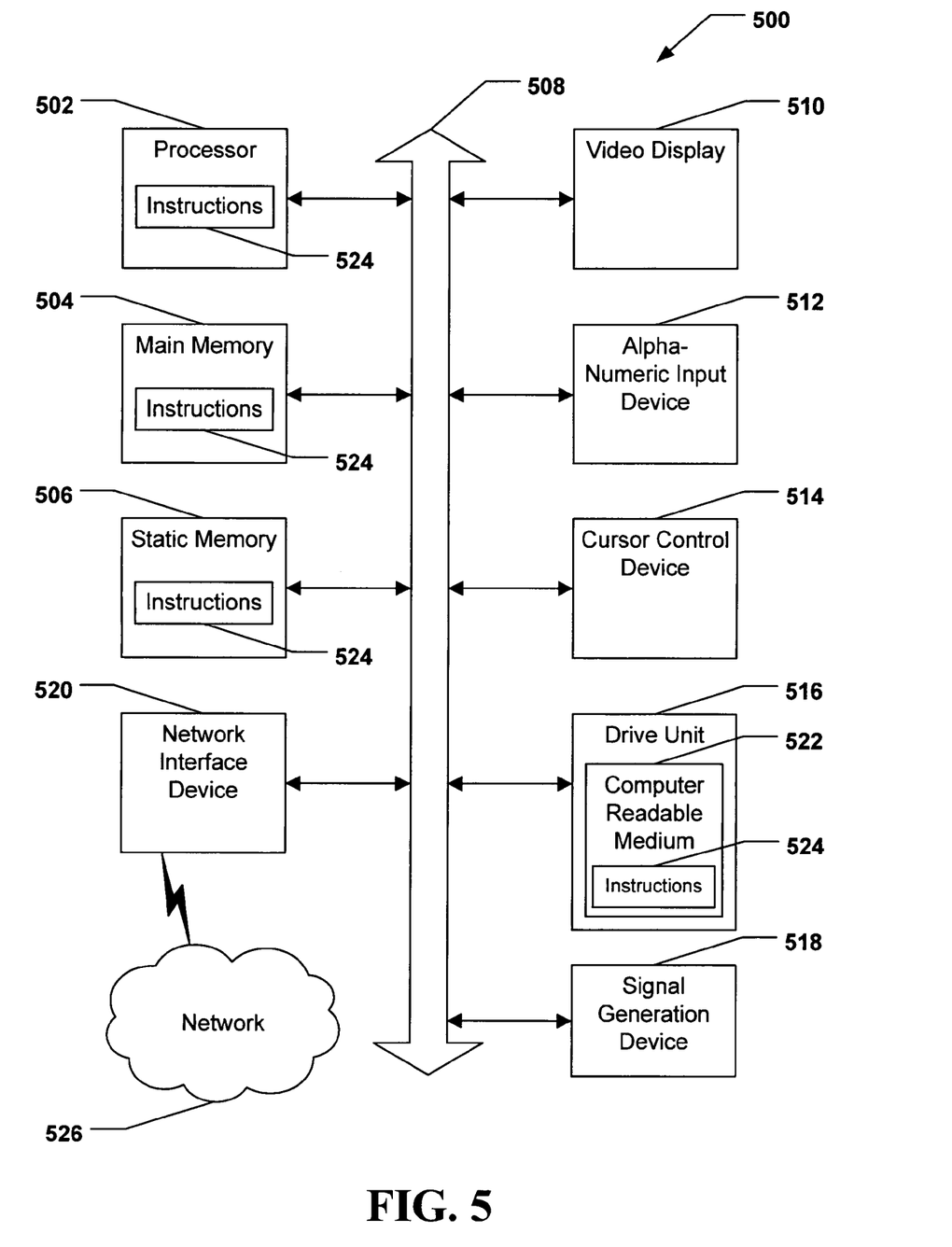
FIG. 5 is a block diagram of a general computer system.

Referring to FIG. 5, an illustrative embodiment of a general computer system is shown and is designated 500. The computer system 500 can include a set of instructions that can be executed to cause the computer system 500 to perform any one or more of the methods or computer based functions disclosed herein. The computer system 500 may operate as a standalone device, or may be connected, e.g., using a network, to other computer systems or peripheral devices, such as a multimedia content distribution system, an Internet Protocol Television (IPTV) system, a server system, a content source, a CPE device, other devices, or any combination thereof. Additionally, in a particular illustrative embodiment, the computing system 500 can communicate with other computing devices via a local area network, a wireless network, or a public network, such as the Internet.

In a networked deployment, the computer system may operate in the capacity of a server or as a client user computer in a server-client user network environment, or as a peer computer system in a peer-to-peer (or distributed) network environment. The computer system 500 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 500 can be implemented using electronic devices that provide voice, video or data communication. Further, while a single computer system 500 is illustrated, the term "system" shall also be taken to include any collection of systems or sub-systems that individually or jointly execute a set, or multiple sets, of instructions to perform one or more computer functions.

As illustrated in FIG. 5, the computer system 500 may include a processor 502, e.g., a central processing unit (CPU), a graphics processing unit (GPU), or both. Moreover, the computer system 500 can include a main memory 504 and a static memory 506, that can communicate with each other via a bus 508. As shown, the computer system 500 may further include a video display unit 510, such as a liquid crystal display (LCD), an organic light emitting diode (OLED), a flat panel display, a solid state display, or a cathode ray tube (CRT). Additionally, the computer system 500 may include an input device 512, such as a keyboard, and a cursor control device 514, such as a mouse. The computer system 500 can also include a disk drive unit 516, a signal generation device 518, such as a speaker or remote control, and a network interface device 520.

In a particular embodiment, as depicted in FIG. 5, the disk drive unit 516 may include a computer-readable medium 522 in which one or more sets of instructions 524, e.g. software, can be embedded. Further, the instructions 524 may embody one or more of the methods or logic as described herein. In a particular embodiment, the instructions 524 may reside completely, or at least partially, within the main memory 504, the static memory 506, and/or within the processor 502 during execution by the computer system 500. The main memory 504 and the processor 502 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 524 or receives and executes instructions 524 responsive to a propagated signal, so that a device connected to a network 526 can communicate voice, video or data over the network 526. Further, the instructions 524 may be transmitted or received over the network 526 via the network interface device 520.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
    receiving, at a server, a request from a first customer premises equipment device to receive multimedia content;
    determining whether the request was received prior to a scheduled end of the multimedia content;
    determining a measured bandwidth of a first connection between a network and the first customer premises equipment device;
    comparing the measured bandwidth to a bandwidth threshold at the server;
    when the request was received prior to the scheduled end of the multimedia content and when the measured bandwidth does not satisfy the bandwidth threshold, selectively recording the multimedia content at the server.

2. The method of claim 1, further comprising providing the multimedia content to the first customer premises equipment device when the measured bandwidth of the first connection between the network and the first customer premises equipment device satisfies the bandwidth threshold.

3. The method of claim 2, further comprising providing the multimedia content to the first customer premises equipment device without a subsequent request from the first customer premises equipment device.

4. The method of claim 1, further comprising restricting customer premises equipment devices other than the first customer premises equipment device from accessing the multimedia content.

5. The method of claim 1, wherein the server is configured to distribute the multimedia content to multiple customer premises equipment devices.

6. The method of claim 1, wherein the request comprises a request to record the multimedia content at the first customer premises equipment device.

7. The method of claim 1, further comprising modifying a number of concurrent multimedia streams provided to the first customer premises equipment device based on a bit rate of each multimedia stream.

8. The method of claim 1, wherein the network comprises an Internet Protocol Television access network.

9. The method of claim 1, wherein the bandwidth threshold is based on at least one of an input bit rate at the first customer premises equipment device, a resolution of input data at the first customer premises equipment device, and a number of input streams of the first customer premises equipment device.

10. The method of claim 1, further comprising:
    determining whether the first customer premises equipment device has a capability to receive the multimedia content recorded at the server; and
    sending the multimedia content recorded at the server to the first customer premises equipment device when the first customer premises equipment device is determined to be capable of receiving the multimedia content.

11. The method of claim 10, wherein determining whether the first customer premises equipment device has the capability to receive the multimedia content further comprises:
    determining a second measured bandwidth of the first connection between the network and the first customer premises equipment device; and
    comparing the second measured bandwidth to the bandwidth threshold.

12. The method of claim 10, wherein determining whether the first customer premises equipment device has the capability to receive the multimedia content comprises determining whether the first customer premises equipment device has sufficient storage space to store the multimedia content.

13. The method of claim 10, wherein the multimedia content recorded at the server is sent to the first customer premises equipment device at a first bit rate when the first customer premises equipment device is receiving multiple input streams, and wherein the multimedia content recorded at the server is sent to the first customer premises equipment device at a second bit rate when one or more of the multiple input streams terminates, wherein the second bit rate is higher than the first bit rate.

14. The method of claim 10, wherein the multimedia content recorded at the server is sent to the first customer premises equipment device and to at least one other customer premises equipment device via a scheduled Internet Protocol multicast.

15. The method of claim 10, wherein the multimedia content recorded at the server is automatically sent to the first customer premises equipment device when the first customer premises equipment device is determined to be capable of receiving the multimedia content.

16. The method of claim 1, further comprising:
allocating a plurality of virtual streams, wherein the plurality of virtual streams correspond to a plurality of input streams for recording multimedia content at the server; and
selectively recording the multimedia content at the server when a particular virtual stream of the plurality of virtual streams is not being used to record other multimedia content.

17. The method of claim 16, further comprising:
allocating the particular virtual stream of the plurality of virtual streams to the first customer premises equipment device; and
selectively recording the multimedia content at the server when the particular virtual stream associated with the first customer premises equipment device is not being used to record the other multimedia content.

18. The method of claim 1, further comprising disabling trick modes associated with the multimedia content when the multimedia content is recorded at the server, wherein the trick modes include at least a fast forward feature.

19. The method of claim 1, further comprising:
receiving a second request from the first customer premises equipment device to cancel receipt of the multimedia content; and
removing the first customer premises equipment device from a list of requestors of the multimedia content.

20. A server comprising:
a memory;
an interface to receive data from multiple customer premises equipment devices; and
a processor, the memory and the interface accessible to the processor, the memory including instructions to cause the processor to:
receive a request at the server via the interface to provide multimedia content to a first customer premises equipment device of the multiple customer premises equipment devices;
determine whether the request was received prior to a scheduled end of the multimedia content;
determine a measured bandwidth of a first connection between a network and the first customer premises equipment device and a bandwidth threshold;
compare the measured bandwidth to the bandwidth threshold at the server; and
when the request is received prior to the scheduled end of the multimedia content and when the measured bandwidth does not satisfy the bandwidth threshold, selectively record multimedia content at a storage device coupled to the processor of the server.

21. The server of claim 20, wherein the bandwidth threshold is determined based on a number of input streams to the first customer premises equipment device.

22. The server of claim 20, wherein the memory further includes instructions to cause the processor to initiate a data stream to provide the multimedia content to the first customer premises equipment device, and wherein a bit rate of the data stream is at least partially based on the measured bandwidth of the first connection between the network and the first customer premises equipment device.

23. The server of claim 20, wherein the memory further includes instructions that cause the processor to determine whether to automatically record the multimedia content based at least in part on a popularity of the multimedia content.

24. A non-transitory computer-readable storage medium comprising instructions that, when executed by a processor, cause the processor to:
receive a request to receive multimedia content at a server from a customer premises equipment device;
determine whether the request to receive the multimedia content was received prior to a scheduled end of the multimedia content;
determine a measured bandwidth of a first connection between a network and the customer premises equipment device;
compare the measured bandwidth to a bandwidth threshold at the server; and
when the request is received prior to the scheduled end of the multimedia content and when the measured bandwidth does not satisfy the bandwidth threshold, record the multimedia content at the server.

25. The non-transitory computer-readable storage medium of claim 24, further comprising instructions that, when executed by the processor, cause the processor to send the multimedia content from the server to the customer premises equipment device when the customer premises equipment device has sufficient available storage capacity and the measured bandwidth satisfies the bandwidth threshold.

26. The non-transitory computer-readable storage medium of claim 24, further comprising instructions that, when executed by the processor, cause the processor to:
send a first portion of the multimedia content to the customer premises equipment device at a first bit rate; and
send a second portion of the multimedia content to the customer premises equipment device at a second bit rate,
wherein the second bit rate is higher than the first bit rate, wherein the first portion of the multimedia content is received at the customer premises equipment device concurrently with multiple input streams via a network interface, and wherein the second portion of the multimedia content is received at the customer premises equipment device when at least one of the multiple input streams terminates.

27. The non-transitory computer-readable storage medium of claim 24, wherein the customer premises equipment device is configured to automatically send a request to record the multimedia content when all input streams of the customer premises equipment device are in use.

* * * * *